United States Patent [19]

Chakrabarty et al.

[11] 3,923,597
[45] Dec. 2, 1975

[54] MERCURY CONCENTRATION BY THE USE OF MICROORGANISMS

[75] Inventors: Ananda M. Chakrabarty, Latham; Denise A. Friello, Schenectady; Joan R. Mylroie, Scotia, all of N.Y.

[73] Assignee: General Electric Company, Schenectady, N.Y.

[22] Filed: Aug. 1, 1974

[21] Appl. No.: 493,693

[52] U.S. Cl. .......................................... 195/2; 210/2
[51] Int. Cl.² ............................................. C12B 1/00
[58] Field of Search ........... 195/2; 210/2, 11, 15, 17

[56] References Cited
OTHER PUBLICATIONS

Sotomura, "Microbiological Treatment of Mercury Compounds and Its Problems," Cited in Chemical Abstracts 77:117967b, (1972).

*Primary Examiner*—A. Louis Monacell
*Assistant Examiner*—R. B. Penland
*Attorney, Agent, or Firm*—Jane M. Binkowski; Joseph T. Cohen; Jerome C. Squillaro

[57] ABSTRACT

A process is described for treatment by the use of microorganisms of a liquid stream containing mercury, mercury salts or organo-mercury derivatives as a pollutant or impurity. The stream is directed through a bed of genetically-engineered Pseudomonas bacteria which bind mercury through elaboration of mercury-binding protein, the coding for which is specified by a transmissible plasmid. Not only are the Pseudomonas organisms resistant to unusually high concentrations of mercury, but the uptake of mercury, which becomes protein-bound is rapid and very specific even in the presence of high concentrations of a number of divalent metal ions.

6 Claims, No Drawings

MERCURY CONCENTRATION BY THE USE OF MICROORGANISMS

BACKGROUND OF THE INVENTION

Mercury and mercury salts are extensively used industrially in the making of batteries, lamps, electrodes, varnishes and paints, for example. These materials are considered hazardous and release into the waterways of the United States is severely restricted.

Mercury poisoning results when mercury salts from industrial effluents deposit in river or lake sediments and are then acted upon by anaerobic bacteria. These bacteria convert mercury salts to monoethyl and dimethyl mercury. These methylated mercury derivatives, particularly the monomethyl mercury become stored in the bodies of fish and, later, consumption of the flesh of such fish leads to acute mercury poisoning. Chemical methods at selectively binding mercury from industrial effluents have the major disadvantage of being non-specific for mercury. Thus, the degree of mercury binding is reduced in the presence of a large excess of divalent metals.

A high specific method of binding mercury from liquides (i.e., industrial effluents or solublized ores) would be highly desirable.

The terminology of microbial genetics is sufficiently complicated that certain definitions will be particularly useful in the understanding of this invention:

Plasmid. — A hereditary unit that is physically separate from the chromosome of the cell; the terms "extrachromosomal element" and "plasmid" are synonymous; when physically separated from the chromosome, some plasmids can be transmitted at high frequency to other cells;

Transmissible plasmid. — A plasmid that carries genetic determinants for its own intercell transfer via conjugation;

DNA. — Deoxyribonucleic acid;

Conjugation. — The process by which a bacterium establishes cellular contact with another bacterium and the transfer of genetic material occurs;

Curing. — The process by which selective plasmids can be eliminated from the microorganism;

Curing agent. — A chemical material or a physical treatment that enhances curing;

Degradative pathway. — A sequence of enzymatic reactions (e.g., 5 to 10 enzymes are produced by the microbe) converting the primary substrate to some simple common metabolite, a normal food substance for microorganisms;

(Plasmid)-. — Indicative of cells lacking in the designated plasmid; or cells harboring a non-functional derivative of the given plasmid;

(Amino-acid)-. — Indicative of a strain that cannot manufacture the designated amino acid;

(Vitamin)-. — Indicative of a strain that cannot manufacture the designated vitamin and (Plasmid)+. — Indicates that the cells contain the designated plasmid.

Plasmids are believed to consist of double-stranded DNA molecules. The genetic organization of a plasmid is believed to include at least one replication site and a maintenance site for attachment thereof to a structural component of the host cell. Generally, plasmids are not essential for cell viability.

Plasmids may be compatible (i.e., they can reside stably in the same host cell) or incompatible (i.e., they are unable to reside stably in a single cell). Among the known plasmids, for example, are sex factor plasmids and drug-resistance plasmids.

DESCRIPTION OF THE INVENTION

The symbol [OCT] signifies the plasmid aggregate of OCT, factor K and MER.

The instant invention is directed to a process employing genetically-engineered Pseudomonas microorganisms, which bind mercury through elaboration of mercury-binding protein, the coding for which is specified by a transmissible plasmid.

In a batch process the liquid and the requisite concentration of bacteria would be mixed and permitted to interact. After an appropriate period of time, the liquid would be filtered off, the cells heated to the 450°–500°C range to vaporize most of the mercury and incinerate the cells and then the gases and vapors cooled to recover metallic mercury.

In a continuous process the stream to be treated is directed through a bed of these Pseudomonas bacteria, which quickly and effectively take up and store the mercury content. After a given period of time, the microorganism bed is removed from the system, heated to a temperature in the 450°–500°C range whereby the cell structure is destroyed and most of the mercury is removed by vaporization. The mercury vapors are then condensed and the mercury is recovered as metallic mercury.

Mercury resistance of many microorganisms has been investigated and it has been generally concluded that the mechanism has been for the organism to ingest mercury salts and simultaneously release a volatile form of mercury. Thus, it is concluded in the article "Volatilization of Mercuric Chloride by Mercury-Resistant Plasmid-Bearing Strains of *Escherichia coli*, *Staphylococcus aureus*, and *Pseudomonas aeruginosa*" by Summers and Lewis (J. Bacteriol. 113 : 1070–1072, 1973) that the volatile form of mercury released from these organisms is very likely metallic mercury, rather than an alkyl mercury compound.

The first observation of mercury resistance in microorganisms wherein it is concluded that the mercury ions are incorporated in the cell structure in some innocuous form, but that no vaporization of mercury occurs is reported in the article "Mercury and Cadmium Resistances Medicated by the Penicillinase Plasmid in Staphylococcus aureus" by Konda, Ishikawa and Nakahara (J. Bacteriol. 117 : 1–7, 1974). No conclusion is reached therein on the utilization of this phenomenon. Further, a report on the mercury resistance of several strains of Pseudomonas is set forth in the article "Mercury-Resistant Bacteria and Petroleum Degradation" by Walker and Colwell (Appl. Microbiol. 27 : 285–287, 1974).

MANNER AND PROCESS OF MAKING AND USING THE INVENTION

This invention is based upon the discovery that the transfer of an [OCT] plasmid from *Pseudomonas oleovorans to Pseudomonas putida* strain PpG1 results in the acquisition of three independent replicons: OCT, factor K and the MER plasmid. Report is made of the fact that the naturally-occurring transmissible degradative [OCT] plasmid can be dissociated into a non-transmissible OCT plasmid and a transfer plasmid [termed "factor K" in the article "Dissociation of a Degradative Plasmid Aggregate in Pseudomonas" by Chakrabarty (J. Bacteriol. 118 : 815–820, 1974)]. However, there is no recognition in this article of the occurrence most of the time of another transmissible plasmid, the MER plasmid, in the naturally-occurring [OCT] plasmid, which MER plasmid is responsible for conferring resistance to mercury ions.

For the practice of this invention, a culture of microorganisms possessing the requisite MER plasmid is now on deposit with the United States Department of Agriculture. This culture is identified as follows:

*P. putida* AC 28 MER$^+$ (NRRL B-8042). - Derived from wild-type *Pseudomonas P. putida* strain PpG1 (ATCC No. 17453) by genetic transfer thereto of a mercury resistance plasmid from *Pseudomonas oleovorans* (ATCC No. 17633).

A sub-culture of each of these strains can be obtained from the permanent collection of the Northern Marketing and Nutrient Research Division, Agricultural Service, U.S. Department of Agriculture, Peoria, Ill., U.S.A.

Morphological observations in various media, growth in various media, general group characterization tests, utilization of sugars and optimum growth conditions for the strains from which the above-identified organisms were derived are set forth in "The Aerobic Pseudomonads: A Taxonomic Study" by Stanier, R. Y. et al. [Journal of General Microbiology 43, pp. 159–271 (1966)]. The toxanomic properties of the above-identified organisms remain the same as those of the parent strains. *P. putida* strain PpG1 (ATCC No. 17453) is the same as strain 77 (ATCC No. 17453) in the Stanier et al study. The strain of *P. oleovorans* referred to herein has been shown to conform to the properties of *P. putida* biotype A and has been designated as *P. putida* strain 244 by Stanier et al ["Genetic Regulation of Octane Dissimilation Plasmid in Pseudomonas" by Chakrabarty, Chou and Gunsalus (Proc. Nat. Acad. Sci. U.S.A. 70 : 1137–1140, 1973)].

All the organisms referred to herein are nonpathogenic as is the general case with laboratory strains of Pseudomonas. Relevant genetic properties of the strains described herein are set forth in Table 1 below. All strains are derived from *P. putida* strain PpG1.

| | |
|---|---|
| Cam (or CAM) | camphor |
| Oct (or OCT) | octane |
| Sal (or SAL) | salicylate |

The compositions of the synthetic mineral media for growth of the cultures were the same for all the Pseudomonas species employed. The mineral medium was prepared from:

PA Concentrate:
100 ml. of 1 molar $K_2HPO_4$
50 ml. of 1 molar $KH_2PO_4$
160 ml. of 1 molar $NH_4Cl$
100 X Salts:
19.5 gm. $MgSO_4$
5.0 gm. $MnSO_4.H_2O$
5.0 gm. $FeSO_4.7H_2O$
0.3 gm. $CaCl_2.2H_2O$
1.0 gm. ascorbic acid
1 liter $H_2O$ Each of the above (PA Concentrate and 100 X Salts) was sterilized by autoclaving. Thereafter, one liter of the mineral medium was prepared as follows:

PA Concentrate - 77.5 ml.
100 X Salts - 10.0 ml.
Agar - 15.0 gm.
$H_2O$ - to one liter (the pH is adjusted to 6.8 – 7.0).

All experiments were carried out at 32°C unless otherwise stated.

In an attempt to see if any of the hydrocarbon degradative plasmids referred to in the Chakrabarty patent might have any genes, which can confer on the host cells the resistance to any of a number of inorganic salts, the resistance pattern of cells harboring CAM, SAL and OCT plasmids was tested with a variety of inorganic metal ions such as lead, mercury, bismuth, nickel, cobalt, etc. Only cells harboring the OCT plasmid exhibited differential inhibition patterns toward any of the different metal ions tested and then only toward mercury.

As is shown in Table 2, the OCT plasmid not only imparts resistance to organic salts such as $HgCl_2$ and $Hg(CN)_2$, but also to organomercuric compounds, such

TABLE 1

| Strain Designation | Phenotype | Plasmids | Derivation |
|---|---|---|---|
| AC 4 | Trp$^-$,Oct$^+$ | OCT,K,MER | Conj. |
| AC 9 | Met$^-$ | | NG |
| AC 13 | His$^-$,Str$^r$ | | NG |
| AC 26 | Trp$^-$,Sal$^+$,Cam$^+$,Neo/Kan$^r$ | SAL,CAM,RP-1 | Conj. |
| AC 27 | Cam$^+$, wild type | CAM | Conj. AC 61→ AC 30 |
| AC 28 | Oct$^+$, wild type | OCT,K,MER | Conj. AC 4 →AC 30 |
| AC 29 | Sal$^+$, wild type | SAL | Conj. AC 26 →AC 30 |
| AC 30 | wild type | | |
| AC 61 | Met$^-$,Cam$^+$ | CAM | Conj. |
| AC 75 | Met$^-$,Oct$^+$ | OCT,K,MER | Conj. AC 4 →AC 9 |
| AC 77 | Met$^-$,Oct$^+$ | OCT,MER | Mit C |

Abbreviations used herein are as follows:

| | |
|---|---|
| Conj. | conjugation |
| NG | N-methyl-N'-nitro-N-nitrosoguanidine |
| Mit C | mitomycin C |
| Met | methionine |
| His | histidine |
| Str$^r$ | streptomycin resistance | as phenyl mercuric acetate. Growth was measured in L broth [Lennox, E. S. (1955), Virology, 1, 190] for 48 hour period. Of the organisms tested AC 30 is wild-type *P. putida* strain PpG1 without any plasmid; AC 28 is the *P. putida* strain that harbors the OCT plasmid and AC 27 and AC 29 harbor the CAM and SAL plasmids, respectively.

TABLE 2

| Mercury Salts | Concentration μg/ml | Growth of AC 30 | AC 28 | AC 27 | AC 29 |
| --- | --- | --- | --- | --- | --- |
| $HgCl_2$ | 0 | + | + | + | + |
|  | 2.5 | − | + | − | − |
|  | 5 | − | + | − | − |
|  | 10 | − | + | − | − |
|  | 20 | − | − | − | − |
| $Hg(CN)_2$ | 0 | + | + | + | + |
|  | 1 | − | + | − | − |
|  | 5 | − | + | − | − |
|  | 10 | − | − | − | − |
| $CH_3COOHg.C_6H_5$ | 0 | + | + | + | + |
|  | 3 | + | + | + | + |
|  | 5 | − | + | − | − |
|  | 7.5 | − | + | − | − |
|  | 10 | − | − | − | − |

In order to determine whether the gene(s) responsible for conferring resistance to mercury salts is borne on the OCT plasmid, an attempt was made to cure the OCT plasmid and the transfer (factor K) independently and then to examine phenotypically the mercury-resistant nature of the cured cells or, alternatively, to cure the parent cells of their mercury-resistance characteristics and then check the associated loss of the OCT plasmid or factor K. Results of such testing are shown in Table 3.

Curing degradative pathways from each strain with mitomycin C was accomplished by preparing several test tubes of L broth containing varying concentrations of mitomycin C and inoculating these tubes with suitable dilutions of early stationary phase cells of the given strain to give concentrations $10^4$ to $10^5$ cells/ml. These tubes were incubated on a shaker at 32°C for 2–3 days. Aliquots from tubes that showed some growth were then diluted and plated on glucose minimal plates. After growth at 32°C for 24 hours, individual colonies were split and respotted on glucose-minimal and degradative pathway - minimal plates to give the proportion of $OCT^-$ in order to determine the frequency of curing. It was, therefore, shown that in each instance the degradative pathway genes are plasmid-borne.

TABLE 3

| Cured Plasmid | Concentration μg/ml | Frequency of curing % | Phenotype of the cured strain* |
| --- | --- | --- | --- |
| OCT | 0 | <0.1 | − |
|  | 2 | 0.8 | $OCT^-K^+MER^+$ |
|  | 4 | 1.5 | $OCT^-K^+MER^+$ |
| K | 0 | <1.0 | − |
|  | 2 | 0.4 | $K^-OCT^+MER^+$ |
|  | 4 | 1.5 | $K^-OCT^+MER^+$ |
| MER | 0 | <0.1 | − |
|  | 2 | <0.1 | − |

TABLE 3 – Continued

| Cured Plasmid | Concentration μg/ml | Frequency of curing % | Phenotype of the cured strain* |
| --- | --- | --- | --- |
|  | 4 | 1.2 | $MER^-K^+OCT^+$ |

*Presence of the OCT plasmid had been determined by the ability of the cured cells to grow with octane/decane(1:1) as the sole source of carbon; that of MER had been determined by the ability of the cells to grow with L broth in presence of 10 μg/ml of $HgCl_2$ and the presence of factor K has been determined by the ability of the cells to donate chromosomal genes to suitable auxotrophic recipients.

It was apparent that all of the cells that had lost the OCT plasmid still retained factor K as well as the mercury-resistant characteristics. Similarly, loss of factor K still enabled the cells to grow with octane and/or in the presence of high concentrations of mercury salts. Thus, genes conferring resistance to mercury (mer gene) must have been separate from either OCT or factor K. This fact is also confirmed in that it was possible to cure the mercury-resistance character (MER plasmid) without loss of either factor K or of the OCT plasmid as shown in Table 3. The transmissibility of the MER plasmid was established by the data in Table 4 below. Selection for the MER plasmid was made on glucose minimal plates with appropriate supplements and containing 25 micrograms/ml of $HgCl_2$. About $1-2 \times 10^7$ cells were plated on the selection plates for scoring the MER plasmids.

TABLE 4

| Donor | Recipient | Selected Plasmid | Frequency of transfer | Phenotype of conjugatants |
| --- | --- | --- | --- | --- |
| AC 4 | AC 9 | OCT | $1 \times 10^{-5}$ | $OCT^+MER^+Met^+$(90%) |
|  |  |  |  | $OCT^+MER^+Met^-$(10%) |
| ($K^+OCT^+MER^+Trp^-$) | AC 30 | MER | $10^{-5}$–$10^{-6}$ | $MER^+OCT^+$(70%) |
|  |  |  |  | $MER^+OCT^-$ (30%) |
|  | AC 13 | MER | $3 \times 10^{-6}$ | $MER^+OCT^+His^+$ (75%) |
|  |  |  |  | $MER^+OCT^+His^-$ (10%) |
|  |  |  |  | $MER^+OCT^-His^-$ (15%) |
| AC 77 | AC 30 | MER | $1 \times 10^{-6}$ | $MER^+OCT^-$ |
| ($K^-MER^+OCT^+Met^-$) | AC 13 | MER | $1 \times 10^{-6}$ | $His^-MER^+OCT^-$ |
|  | AC 30 | OCT | $<1 \times 10^{-8}$ |  |

The majority of the recipients that received OCT from the $OCT^+$ $MER^+$ $K^+$ donor (AC 4) also acquired MER. Similarly, when selected for $MER^+$, the majority of the conjugatants acquired OCT. The transfer of either OCT or MER is almost always associated with chromosomal transfer mediated by factor K. The independent transmissibility of MER is evident when a $K^-$ derivative of AC 75 (AC 77) is used as donor. Thus, transfer of MER is accomplished without concomitant transfer of chromosomal genes or of the OCT plasmid. The mercury-resistant character can be cured from such conjugatants by treatment with mitomycin C suggesting that the transfer MER character replicates as an independent plasmid inside the conjugatants.

As is shown in Table 5, OCT$^+$ cells take up mercury salts at a much higher rate than the OCT$^-$ cells and the rate of mercury uptake by the OCT$^+$ cells is very rapid. Almost 95–98% of the mercury salts are absorbed in 60 minutes, after which there is no further absorption by the cells. In contrast, uptake of mercury by OCT$^-$ cells is slow and leads to cell death and lysis. Cells were treated with about 15 micrograms/ml $HgCl_2$. At the time intervals given in the table, aliquots were withdrawn and were rapidly filtered through membrane filters. Mercury in the filtrate was determined using a Coleman Model MAS-5 Mercury Analyzer System.

TABLE 5

| Time of Contact (min) | % Removal of Hg by | |
|---|---|---|
| | OCT$^-$ P. putida | OCT$^+$ P. putida |
| 0 | 0 | 0 |
| 2 | 17 | 41 |
| 10 | 21 | 54 |
| 60 | 59 | 95 |

Investigation has shown that after exposure (mercury in the 2–50 microgram/ml range) to mercury for 60 minutes in which about 97% of the mercury was removed by the OCT$^+$ cells (about $10^{10}$ cells/ml), the rate of uptake fell off and remained virtually constant up to two days. Most of the intracellular mercury was found by analysis to be protein-bound and there was no loss of such protein-bound mercury in a period up to two days. It is, therefore, clear that the mercury salts are not further metabolized by the cells, but remain bound with the protein in a detoxified form.

Testing was undertaken to determine how specific the uptake of mercury is in the OCT$^+$ cells. As shown in Table 6, even the presence of 100 fold excesses of a mixture of each of zinc, lead, cobalt, nickel and cadmium did not have any effect on the rate of mercury removal by the cells. The relatively low percentage removal is due to the use of an early culture of low cell density (about $10^9$ cells/ml).

TABLE 6

| Cells | Metal Ions | Concentration $\mu$g/ml | Time of Contact (min) | % Removal of Hg |
|---|---|---|---|---|
| OCT$^+$P. putida | HgCl$_2$ | 20 | 2 | 27 |
| | HgCl$_2$ | 20 | 2 | 40 |
| | Zn(NO$_3$)$_2$ | 2000 | 60 | 50 |
| | Pb(NO$_3$)$_2$ | 2000 | | |
| | Co(NO$_3$)$_2$ | 2000 | | |
| | Ni(NO$_3$)$_2$ | 2000 | | |
| | Cd(NO$_3$)$_2$ | 2000 | | |

The transmissible MER plasmid has been transferred to other Pseudomonas cells and even to *E. coli*.

The general method of this invention for removing mercury contaminants from a liquid (an aqueous system) comprises the steps of:
a. bringing the liquid into contact with Pseudomonas organisms each of which contains at least one MER plasmid that generates mercury-binding protein,
b. maintaining said liquid and said organisms in contact for at least about 10 minutes and
c. separating the liquid so treated from said organisms.

In addition, the organisms with their bound mercury content may be heated to a temperature in the 450°–500°C range whereupon most of the mercury will be evaporated and the organisms will be incinerated. Cooling of the resulting gaseous products will enable separation and recovery of the mercury as a liquid. Some mercury will remain as a residue in the form of mercuric oxide, which can easily be processed to yield metallic mercury.

No nutrient need be supplied for the organisms during conduct of this process. Any aqueous system (e.g., water containing oily residues) may be treated. If the mercury content is higher than the toxicity level for the specific Pseudomonas used, the liquid should be diluted with water to reduce the concentration below the toxicity level in order to insure the activity required on the part of the Pseudomonas organisms in binding the mercury.

Depending upon the permissible level of mercury in the treated liquid, the liquid may have to be brought into contact with one or more additional concentrations of the MER$^+$ Pseudomonas bacteria to successively reduce the mercury content to an acceptable level. Also, depending upon the concentration of mercury contaminant in the liquid, the cell concentration employed may vary from about $10^9$ cells/ml to about $10^{11}$ cells/ml. Although the preferred contact time is about 1 hour, longer (e.g., 2 hours) or shorter (e.g. 10 minutes) periods may be employed. The optimum combination of cellular concentration and time to be employed for a given mercury content liquid may be readily determined by routine experimentations.

In preparing the concentration of cells, the culture is permitted to grow for a specified (e.g., overnight) period of time to produce some known concentration. This culture is then centrifuged to obtain the cells present. In a batch process this centrifuged mass would be added to a known amount of the liquid to be treated in order to adjust the cell concentration to the desired level. In the case of a continuous process the flow rate of the liquid passing through the container holding the cell mass would be adjusted and the total throughput of mercury-containing liquid would be set in order to fix the contact time and mercury exposure of the organisms.

BEST MODE CONTEMPLATED

The best mode contemplated employs the MER$^+$ Pseudomonas culture NRRL B-8042. Thus, for an aqueous system containing about 25 micrograms of mercury per milliliter of liquid a cell concentration and time of contact would be about $10^{10}$ cells/ml and about 60 minutes, respectively. A batch process is preferred wherein the requisite amount of centrifuged cells is mixed with the liquid to be treated. After the treatment period, the treated (mercury-depleted) liquid is separated from the cell mass. The cell mass is then heated to a temperature in the 450°–500°C range. At this temperature most of the mercury is evaporated as metallic mercury (some mercury remains as mercuric oxide) and the cell mass is converted to ash, $H_2O$ and $CO_2$. The gases and vapors from this incineration step are conducted to a condenser immersed in a bath, e.g., acetone and solid $CO_2$. Therein the mercury is condensed as a mirror deposit for separation and recovery, the water freezes and the carbon dioxide will be vented from the system.

What we claim as new and desire to secure by Letters Patent of the United States is:

1. A process for significantly reducing the mercury content of an aqueous liquid containing mercury contamination comprising the steps of:
   a. bringing said aqueous liquid into contact with a Pseudomonas organism genetically engineered to contain transmissible MER plasmid, said MER plasmid having the property of generating mercury-binding protein, the concentration of said organism in contact with said liquid being at least about $10^9$ MER-containing cells per ml of said liquid,
   b. maintaining said liquid-organism contact for at least about 10 minutes whereby mercury becomes protein bound by said MER-containing cells of said organism and
   c. recovering the resulting liquid from the resulting organism.

2. The process of claim 1 wherein the resulting organism is incinerated at a temperature in the 450°–500°C range and mercury evaporated therefrom is recovered.

3. The process of claim 1 wherein the Pseudomonas organism employed is *P. putida* MER$^+$.

4. The process of claim 1 conducted as a batch process.

5. The process of claim 1 wherein the treated liquid is subjected to a repetition of the treatment steps.

6. The process of claim 1 wherein the liquid-organism contact time is about 60 minutes and mercury removal is about 95 percent.

* * * * *